March 16, 1937.  H. L. WALKER  2,073,912

SCALE

Filed Oct. 28, 1930  2 Sheets—Sheet 1

INVENTOR.
HAROLD L. WALKER,
BY Duell, Dunn & Anderson.
ATTORNEYS.

March 16, 1937.   H. L. WALKER   2,073,912

SCALE

Filed Oct. 28, 1930   2 Sheets-Sheet 2

INVENTOR.
HAROLD L. WALKER,
BY Duell, Dunn & Anderson.
ATTORNEYS.

Patented Mar. 16, 1937

2,073,912

UNITED STATES PATENT OFFICE 2,073,912

SCALE

Harold L. Walker, Brooklyn, N. Y., assignor to The Jacobs Bros. Co. Inc., a corporation of New York Application October 28, 1930, Serial No. 491,649

1 Claim. (Cl. 265—68)

This invention relates to a scale having functionally and structurally improved characteristics and primarily intended for employment as a personal weighing scale.

More especially, a scale constructed in accordance with the present invention is of primary utility when employed in a bathroom or nursery where it may be instantly available to clearly show the weights of persons using the same. As such, it is an object of the present invention to construct a scale, the mechanism of which will be extremely compact and by means of which, accordingly, it is possible to provide a scale occupying a minimum amount of floor space.

A further object of the invention is that of furnishing a scale which if desired may be of minimum heighth so that it will provide only to the smallest extent a floor obstruction.

A further object is that of furnishing an apparatus of this character which will embody relatively few parts, each individually simple and rugged in construction and capable of manufacture largely by automatic machinery, these parts being capable of assemblage within a minimum of time and by relatively inexperienced labor, and when so assembled being capable of ready "truing up" and operating over long periods of time with freedom from mechanical difficulties and inaccuracies in registered results.

Another object is that of furnishing a scale, the registering mechanism of which may be readily viewed while the person is operating the scale.

With these and other objects in mind, reference is had to the attached sheets of drawings, illustrating one practical embodiment of the invention, and in which.

Figure 1:
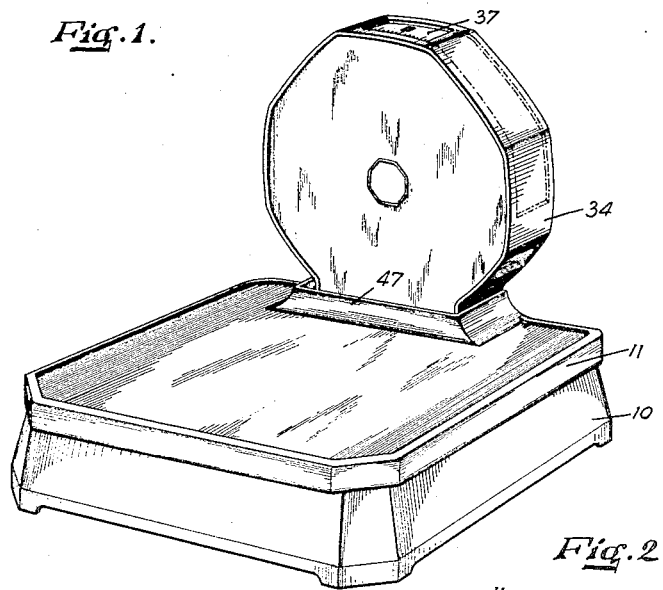
Fig. 1 is a perspective view of one form of scale embodying the construction of the present invention.
Figure 2:
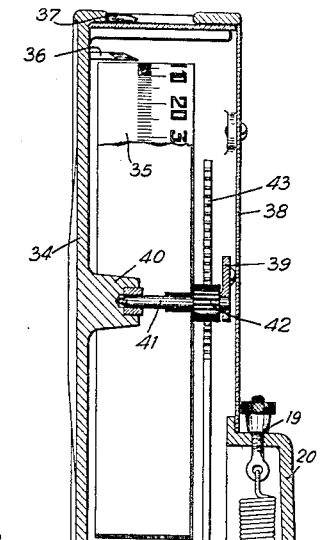
Fig. 2 is an enlarged section side view thereof.
Figure 2:
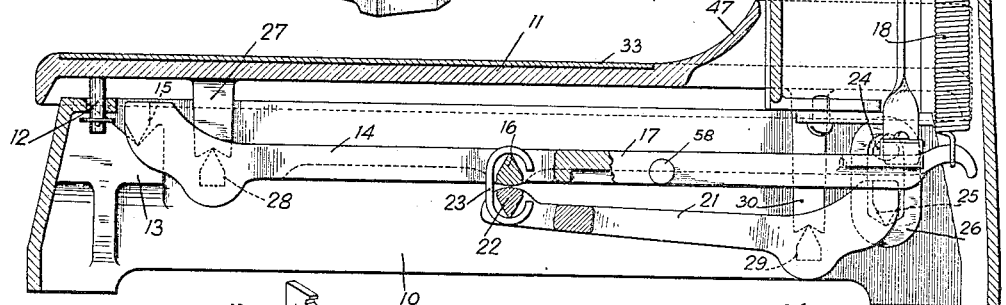

In these views, the numeral 10 indicates a base which preferably may be of minimum heighth. Disposed above this base is a platform 11 and an accidental detachment of the platform from the base may be prevented by means for example of securing pins 12 to the former and having them extend through openings in the latter, these pins carrying beyond such openings washers which act as stop elements.

The base carries adjacent its forward end bearing supports or blocks 13 which may be of any desired material but preferably are of suitably hardened metal. The beam 14 has extensions 15 in the nature of knife edge bearing members and these extensions cooperate with the blocks or rests 13 and are supported thereby. The beam 14 is U or fork shaped and adjacent the point of intersection of its arms presents a bearing member 16. Beyond this point of intersection, the beam is continued as at 17 and extends in the embodiment illustrated to the rear end of the base at which point it is supported by the lower end of a coil spring 18, the upper end of which is adjustably mounted as at 19 in an extension 20 of the base. A second U or fork shaped beam 21 is disposed in opposition to the beam 14 and has at a point beyond the point of juncture of its arms a bearing member 22 which extends in alignment with the member 16. These members are coupled by a loop 23 of suitable metal and thus these portions of the beams move in synchronism. The base 10 also provides knife edge bearing members 24, these being disposed preferably adjacent the rear end of the base. The ends of the beam 21 are extended to provide knife edge bearing members 25 in line with bearing members 24 and these pairs of members are connected by loops 26 which provide the equivalents of bearing blocks. Adjacent its outer or rear end, the platform 11 is supported as for example by the use of posts 27 which at their lower ends provide bearing portions cooperating with the edges of knife shaped bearing members 28 forming parts of the beam 14. The beam 21 provides similar knife edge bearing members 29 and posts 30 extend downwardly from the rear end of the platform in line with these bearing members and have at their lower ends faces of suitable configuration to furnish the equivalent of bearing blocks.

Figure 4:
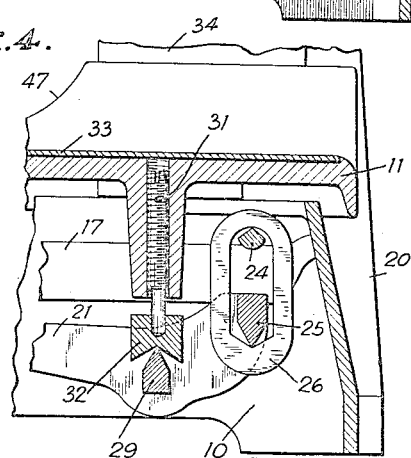
Fig. 4 shows the bearing construction which may be employed.
Figure 5:
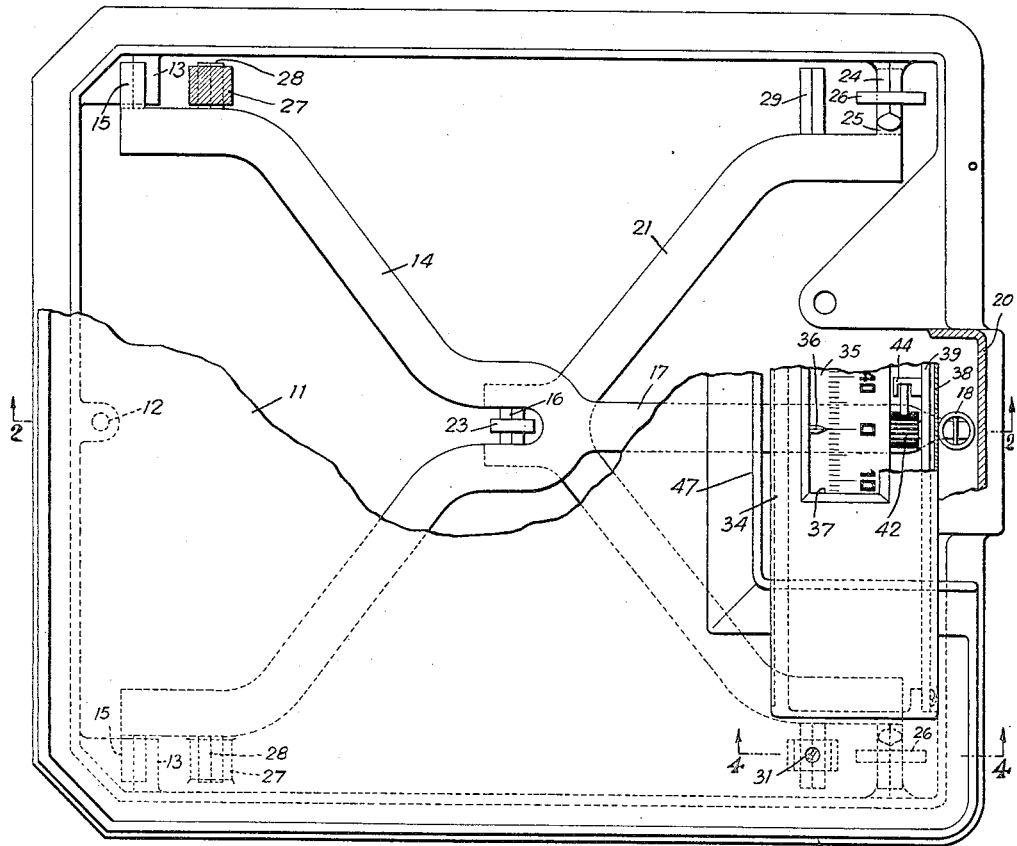
Fig. 5 is a plan view of the scale as illustrated in Fig. 2.

In most instances, however, it is preferred that these bearings particularly be of the nature shown in Fig. 4 in which an adjustment is provided for. In this figure, it will be noted that the posts are bored and screw threaded to receive correspondingly threaded pins 31 which may be adjusted axially within the bores and thus project to a greater or lesser extent block members 32 against which their lower ends bear and which in turn engage the knife edge bearing members 25. Accordingly, a ready adjustment is furnished at this point which will permit an expeditious truing up of the scale after the parts have once been assembled and the bore within which the pin 31 is positioned is normally sealed for example by a covering 33 so that no objections will arise incident to dirt entering the bore.

With a view to furnishing a suitable registering means, the base is extended as for example by a separate unit 34 to provide a portion housing a drum 35. The face of this drum bears graduations which indicate weight values and registering with these graduations is a pointer 36. The periphery of the drum as well as this pointer are visible through an opening 37 in the top of the extension 34 and the rear face of this extension is normally closed by a cover plate 38, it being noted however that the portion 20 of the base extends preferably beyond this cover so that the adjustment 19 may remain accessible with the cover in place. Extending across the portion 34 of the base is a bar 39 which in conjunction with a boss 40 extending inwardly from the end casing portion 34 serves as a mounting for a rotatable shaft 41. This shaft supports the drum 35 and additionally mounts a pinion 42, the teeth of which are engaged by a rack 43. Constant engagement between the teeth of these elements is assured by extending a portion 44 of the bar to provide a rack confining element, and thus movements on the part of the rack will be translated into rotation on the part of the drum.

Figure 3:
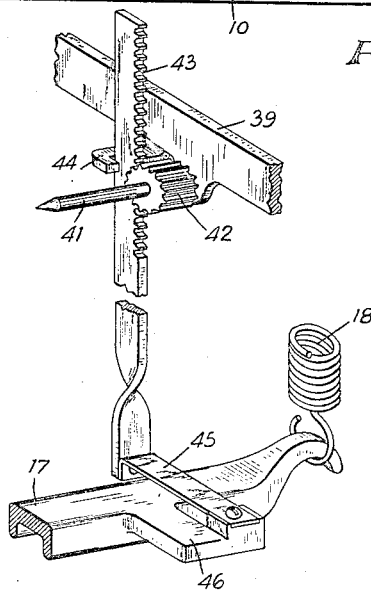
Fig. 3 is a fragmentary perspective view of one of the details of the operating mechanism.

In a scale of this nature which is called upon to support relatively great weights, the shocks to which the registering mechanism is subjected are correspondingly great and if some provision is not made to guard against damage, the parts are liable to become inoperative to an extent such that proper results will not be had. With this in mind, the present invention aims to provide a construction avoiding these difficulties. Thus, as in Fig. 3, a flexion strip 45 is employed, one end of which is attached to the lower end of the rack bar, the opposite end being secured to an extension 46 of the extended beam portion 17. Consequently, a yielding connection will be provided which will transmit in a cushioned manner thrusts to the rack bar, thus permitting the inertia of the registering mechanism to be overcome gradually and also permitting such registering mechanism to reach a stabilized condition without abrupt stoppage.

Also preferably according to the present invention, the platform itself is extended as has been indicated at 47 to provide a portion enclosing the housing and merging with the same. This enclosing portion also prevents to the greatest extent the entrance of foreign matter into the mechanism.

Figure 6:
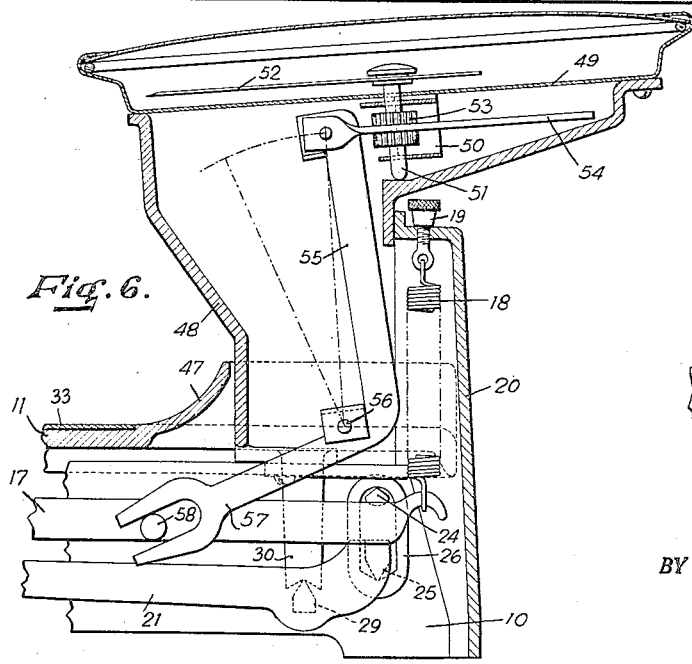
Fig. 6 is a sectional side view showing a slightly different form of registering mechanism than that illustrated in the preceding views.

Now referring to Fig. 6, it will be observed that the construction employed is in all respects similar to that previously described except that in lieu of applying the unit 34 to the base, a unit 48 is applied thereto which is flared upwardly and mounts a dial 49 preferably inclined to the horizontal and additionally provides suitable supports 50 for a shaft 51. This shaft carries a pointer 52 which traverses the graduations in the dial 49 and a pinion 53 is affixed to the shaft and meshes with the teeth of a rack 54. A bell-crank lever 55 is pivotally mounted as at 56 and has one of its ends connected to the end of the rack, its opposite end terminating in a fork 57, the arms of which straddle a pin 58 carried by the extended beam portion 17.

Figure 7:
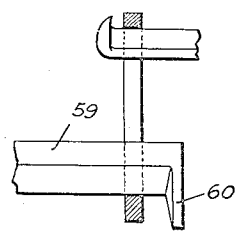
Fig. 7 is a fragmentary enlarged view of one of the bearing units.

Finally, referring particularly to Fig. 7, it will be noted that in order to provide a construction by means of which to the greatest extent any danger of the knife edge members becoming displaced from within the bearing or loop members will be prevented. These members one of which has been indicated at 59 may have a foot portion 60. As a consequence, while this portion will not interfere with the assemblage of the scale, it will prevent the knife edge member becoming accidentally displaced with respect to the loops or supporting elements.

Thus, it will be understood the several objects of the invention specifically afore referred to are achieved. It will moreover be understood that numerous changes in construction and rearrangements of the parts might be resorted to without departing from the spirit of the invention as defined by the claim.

Having described my invention, what I claim as new and desire to secure by Letters Patent, is:

A scale including, in combination, a platform, mechanism supported by said base for supporting said platform, a registering mechanism and housing therefor supported by said base and adjacent one end thereof, said registering mechanism being connected to said platform supporting mechanism, an extension forming a part of said base to the rear of such housing and extending adjacent the same to a point short of the upper edge of the latter, and movement resisting means positioned within such extension and supported from the upper end of such extension, said movement resisting means being connected to said platform supporting means.

HAROLD L. WALKER.